UNITED STATES PATENT OFFICE.

HENRY A. KOHMAN, OF PITTSBURGH, PENNSYLVANIA, CHARLES HOFFMAN, OF NEW ROCHELLE, NEW YORK, AND ALFRED EDWARD BLAKE, OF PITTSBURGH, PENNSYLVANIA, ASSIGNORS, BY MESNE ASSIGNMENTS, TO WARD BAKING COMPANY, OF NEW YORK, N. Y., A CORPORATION OF NEW YORK.

BREAD-MAKING COMPOSITION.

1,282,868.      Specification of Letters Patent.      Patented Oct. 29, 1918.

No Drawing. Original application filed March 26, 1913, Serial No. 756,940. Divided and this application filed December 10, 1914. Serial No. 876,503.

*To all whom it may concern:*

Be it known that we, HENRY A. KOHMAN, CHARLES HOFFMAN, and ALFRED EDWARD BLAKE, all citizens of the United States, residing, respectively, at Pittsburgh, Allegheny county, State of Pennsylvania, New Rochelle, Westchester county, State of New York, and Pittsburgh, Allegheny county, State of Pennsylvania, have invented certain new and useful Improvements in Bread-Making Compositions; and we do hereby declare the following to be a full, clear, and exact description of the invention, such as will enable other skilled in the art to which it appertains to make and use the same.

In an application for Letters Patent of the United States, filed by us, under date of March 26, 1913, Serial No. 756,940, we have described certain improvements in the making of leavened bread based upon the discovery that whether the bread is made in accordance with the sponge process or in accordance with the straight dough process, the quantity of yeast that would otherwise be necessary for completing the fermentation within a given period of time may be very materially diminished by supplying to the batch certain salts which have a stimulating effect upon the activity and propagation of the yeast cells, in the presence of the starchy dough mixture; and that, also, employing the same quantity of yeast as that ordinarily used, the employment of the salts permits the fermentation of the batch of dough to proceed more rapidly, while still preserving satisfactory commercial conditions so that, when desired, the bread-making process may be finished in a correspondingly lesser period of time. Among the salts that have been found serviceable for the purposes referred to are appropriate innocuous salts of calcium.

The present application constitutes a division of the application hereinbefore referred to, and relates to the novel composition of matter involved in the incorporation of the calcium salts in the filler (such as flour, or other appropriate starchy material), in which they are adapted to be marketed.

As more fully set forth in our application Serial No. 756,940 referred to, calcium salts of low cost, as, for instance, calcium sulfate, are appropriate to the uses of the invention. So also, relatively small amounts of these salts are required for the production of the desired effects, and the employment of the calcium salts in the bread-making operation is of additional advantage in that it makes up, in part at least, the deficiency in calcium salts which is characteristic of white bread, wherein the amount of mineral matter present is extremely low.

In so far as the use of calcium salts is concerned, we have obtained our best results by adding to the bread-making batch, either at the commencement of the sponge process or at the commencement of the straight dough process, two ounces of calcium sulfate to each 100 lbs. of flour contained in the mixture. We do not find it of advantage to increase these proportions, but they may be considerably diminished and yet give important and valuable results; so that, while recommending the use of two ounces of calcium sulfate to 100 lbs. of flour, we do not restrict ourselves to that relative amount.

Calcium sulfate is a neutral salt, and it is cheap and non-hygroscopic. With a suitable filler, such as, for instance, flour, or some other suitable starchy material, it is well adapted to be made up into a suitable mixture that can be used with convenience and accuracy as a composition of matter for sale to the trade. It will be understood, however, that we do not restrict ourselves to the employment of calcium sulfate in the mixture, nor to the employment of neutral calcium salts therein. Thus, in some instances, it may be feasible and desirable to use the acid salts or even those salts which give an alkaline reaction. For instance, calcium di-acid phosphate, $Ca(H_2PO_4)_2$, is available for the purpose, in lieu of calcium sulfate, although the acid salt referred to is of higher cost.

In putting the calcium salts upon the market in the form of a composition of matter, in connection with a filler of flour or other starchy material, the filler should be of such relatively large amount (say ten times the amount by weight of the salt), that any slight inaccuracies of the user in adding the mixture to the batch will be correspondingly unimportant for the realization of the intended results. It is further apparent that, if desired, the necessary proportion of salts may be incorporated in the flour at the time it is barreled at the mill, and may be sold to the trade in that form.

What we claim is:

1. As a new composition of matter for use, associated with yeast, in the making of leavened bread, flour and other starchy material containing in admixture therewith an innocuous calcium salt in definite and relatively small proportion, whereby a definite and predetermined still smaller proportion of the calcium salt may be homogeneously incorporated in the dough batch; substantially as described.

2. As a new composition of matter for use, associated with yeast, in the making of leavened bread, flour or other starchy material containing in admixture therewith calcium sulfate in definite and relatively small proportion, whereby a definite and predetermined still smaller proportion of the calcium salt may be homogeneously incorporated in the dough batch; substantially as described.

In testimony whereof we affix our signatures in the presence of two witnesses.

HENRY A. KOHMAN.
CHARLES HOFFMAN.
ALFRED EDWARD BLAKE.

Witnesses to the signatures of Henry A. Kohman and Alfred Edward Blake:

S. C. PERRING,
JOS. F. SMITH.

Witnesses to the signature of Charles Hoffman:

M. A. BILL,
L. BATES.